S. BRALOVE.
PIN SECURING DEVICE.
APPLICATION FILED JUNE 10, 1918.
1,296,042.
Patented Mar. 4, 1919.
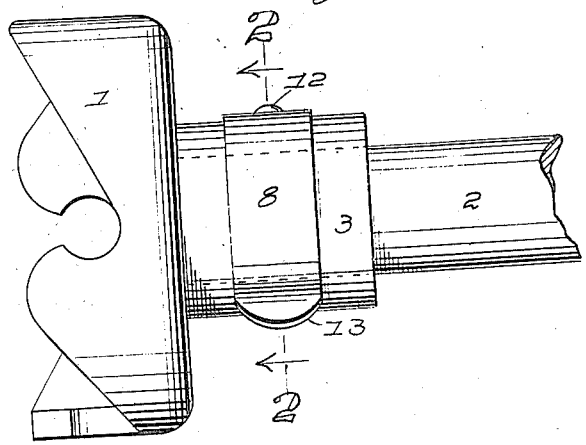
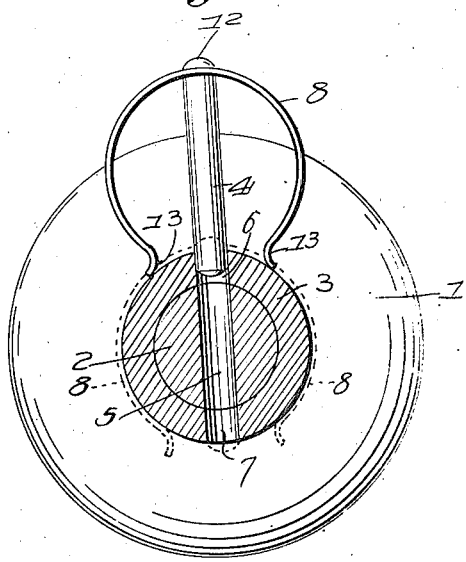
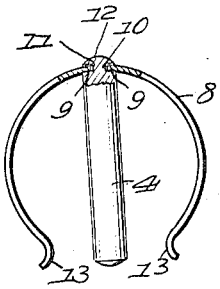
Inventor
Simon Bralove,
By E. W. Bond
Attorney

UNITED STATES PATENT OFFICE.

SIMON BRALOVE, OF WASHINGTON, DISTRICT OF COLUMBIA.

PIN-SECURING DEVICE.

1,296,042.  Specification of Letters Patent.  Patented Mar. 4, 1919.

Application filed June 10, 1918. Serial No. 239,166.

*To all whom it may concern:*

Be it known that I, SIMON BRALOVE, a citizen of the United States, residing at Washington, in the District of Columbia, have invented certain new and useful Improvements in Pin-Securing Devices, of which the following is a specification.

The present invention relates to novel means for securing a pin against displacement, and while in the present instance it is shown and will be described as designed more especially for use in connection with the crank of the starter of an automobile, it is to be understood that the invention is not in any wise limited to any such particular use as it is applicable for various uses and in other connections.

Experience has proven that the pins which secure the cranks in position in the sockets of the starters and more especially in machines of the Ford type, often become displaced and trouble is experienced in replacing the same, generally necessitating the insertion and heading of the pin or supplying a new one. This is no easy matter, owing to the inaccessibility of the ends of the pin, generally necessitating the employment of special implements to properly and satisfactorily replace and secure the pin in position and to hold it against accidental jarring out or displacement.

The present invention has among its objects that of providing a simple and efficient means for holding the pin and one which can be quickly and expeditiously applied by any one at any time without the necessity of the employment of skilled labor or special tools.

Other objects and advantages of the invention will hereinafter appear and the novel features thereof will be particularly pointed out in the appended claims.

The invention is clearly illustrated in the accompanying drawing, which, with the numerals of reference marked thereon, form a part of this specification, and in which—

Figure 1 is a side elevation, with a portion of the crank member broken away, showing the application of my present invention.

Fig. 2 is an enlarged cross section on the line 2—2 of Fig. 1, looking in the direction of the arrows.

Fig. 3 is an elevation of the pin with its attached fastening member, portions being broken away and parts shown in section.

Like numerals of reference indicate like parts in the different views.

Referring now to the details of the drawing, 1 designates the ratchet portion of a starter and 2 a portion of the crank of an automobile of the usual type adapted to engage in the socket 3 of the member 1.

As is well known, these members are usually secured together by a pin. This pin has to be headed or secured in some way to prevent it becoming jarred out of place, or otherwise displaced, and the present invention is designed to accomplish this end.

In carrying out my invention, I take a pin 4 adapted to engage in the opening 5 of the crank member 2 and coincident openings 6 and 7 of the socket member 3, as shown best in Fig. 2. 8 is the spring retainer which serves to hold this pin against accidental displacement, but permitting of ready removal of the pin when desired. This retaining member is formed of resilient material and is substantially circular in form, being affixed at the center of its length to one end of the pin in any convenient or well-known way. I have found it convenient to form the pin near one end with a shoulder 9, the reduced portion 10 thus formed being passed through an opening 11 in the member 8 and the material of the end of the pin then upset or headed over the adjacent portions of the member 8, as seen clearly in Fig. 3. This however, is only one of the different ways in which the retaining member 8 may be affixed to the pin. In some instances, the heading or upsetting of the end of the pin may be such as to permit of slight rotary movement of the pin with relation to the retainer, which, in some instances, may be found desirable and facilitating application of the pin and its retainer. The arms of this retainer 8 are such that their free ends terminate substantially in alinement with the free end of the pin 4, although the pin may be of greater or less length as may be deemed most advisable. The ends of the retainer are curved, as shown at 13, so as to the more readily ride over the outer surface of the member 3 as the pin is applied. This is done by entering the end of the pin in the opening 6 of the member 3, when the ends of the arms of the retainer 8 will bear against the outer face of the member 3 as indicated in full lines in Fig. 2. The pin is then forced in through the opening 5 in the member 2 and into the opening 7 of the member 3, as indicated by dotted lines in Fig. 2. As this is done, the arms of the retaining member 8 will be spread outwardly until they reach such point that their ends pass the midcenter of the member 3, when the resiliency of the retaining member causes the same to spring inward so that when the pin is in the position shown in dotted lines in Fig. 2 the retaining member 8 will be in the position shown in dotted lines in said figure, closely embracing the member 3, with the ends of the retaining member below the midcenter thereof and holding the pin in position with sufficient friction to prevent disengagement or displacement of the pin. When it is desired to remove the pin, force is applied to move the pin and its retaining member outward, which will overcome the frictional engagement of the parts and the pin may thus be easily removed. The retaining member 8 being affixed to the pin, there is no danger of separation of the parts when the pin is removed.

Modifications in details may be resorted to without departing from the spirit of the invention or sacrificing any of its advantages.

What is claimed as new is:—

1. A pin and a resilient retaining member secured between its ends to one end of the pin and free to rotate relatively thereto, said member being substantially circular in form with free ends and rounded portions adjacent the free ends, said pin being substantially the length of the diameter of the retaining member.

2. The combination with two interengaged coöperating members, of a pin passed through said members, and a resilient retaining device carried by said pin and free to rotate relatively thereto and adapted to closely embrace one of said members when the pin is passed therethrough, to prevent accidental displacement of the pin.

In testimony whereof I affix my signature in the presence of two witnesses.

SIMON BRALOVE.

Witnesses:
H. M. BRALOVE,
E. W. BOND.